US006657039B1

(12) United States Patent
Song et al.

(10) Patent No.: US 6,657,039 B1
(45) Date of Patent: Dec. 2, 2003

(54) PROCESS AND EQUIPMENT FOR PREPARING AROMATIC POLYCARBONATE

(75) Inventors: Kwang-Ho Song, Daejeon (KR); Kwang-Ho Park, Daejeon (KR)

(73) Assignee: LG Chemical Co., Ltd., Daejon (KR)

( * ) Notice: Subject to any disclaimer, the term of this patent is extended or adjusted under 35 U.S.C. 154(b) by 0 days.

(21) Appl. No.: 10/009,953

(22) PCT Filed: Jun. 12, 2000

(86) PCT No.: PCT/KR00/00618

§ 371 (c)(1),
(2), (4) Date: Dec. 12, 2001

(87) PCT Pub. No.: WO00/76657

PCT Pub. Date: Dec. 21, 2000

(30) Foreign Application Priority Data

Jun. 12, 1999 (KR) ........................................ 1999-21899
Jun. 9, 2000 (KR) ........................................ 2000-31633

(51) Int. Cl.[7] .............................................. C08G 64/00
(52) U.S. Cl. ........................ 528/198; 528/196; 422/131
(58) Field of Search .......................... 422/131; 528/196, 528/198

(56) References Cited

U.S. PATENT DOCUMENTS 6,476,249 B1 * 11/2002 Ito ............................... 526/64

* cited by examiner

Primary Examiner—Terressa M. Boykin
(74) Attorney, Agent, or Firm—Baker Botts, LLP

(57) ABSTRACT

The present invention relates to a process and equipment for preparing highly polymerized aromatic polycarbonate by postpolymerizing polycarbonate prepolymer. The polycarbonate prepolymer is formed by the melt transesterification of carbonate ester and diol compound. The polycarbonate prepolymer is postpolymerized using a horizontal tubular reactor comprising rotational plates, several separated compartments divided by the rotational plates, and vents. The degree of polycarbonate polymerization can be continuously controlled by regulating the residence time of reactants in the reactor compartments. This is achieved in the present invention by regulating the rate of polycarbonate prepolymer injection into the reactor. Discoloration of final products can be prevented in the present invention by discharging byproduct(s), aromatic alcohol, from the reactor compartment through a vent.

16 Claims, 2 Drawing Sheets

PROCESS AND EQUIPMENT FOR PREPARING AROMATIC POLYCARBONATE

BACKGROUND OF THE INVENTION (a) Field of the Invention

The present invention relates to a process and equipment for preparing highly polymerized polycarbonate by polycondensation of polycarbonate prepolymers that are prepared by melt transesterification of carbonate ester and diol compounds using a horizontal tubular reactor comprising a plurality of rotating disks, a plurality of compartments divided by the rotating disks, and vents.

(b) Description of the Related Art

Highly polymerized polycarbonate is a widely used engineering plastic due to its high transparency, excellent thermal resistance and impact resistance.

Polycarbonate can be prepared by a Schotten-Baumann reaction. In this process, polycarbonate is prepared by interfacially polymerizing phosgene and diol compounds. However, since the reactant, phosgene, and the solvent, methylene chloride, used in said reaction are very toxic, the process involves many environmental problems.

In order to solve the above problems, a melt polymerization method was developed. Met polymerization is conveniently performed by the two steps of transesterification step and melt polycondensation step. In the melt transesterification step, carbonate ester and diol compounds are melt transesterified in the presence of a catalyst to prepare polycarbonate prepolymers, and in the melt polycondensation step, said prepolymers are transferred to a polymerization reactor and are polymerized further to obtain highly polymerized polycarbonates.

The following patents relate to the afore-mentioned polycondensation step, but they still involve some problems.

U.S. Pat. No. 5,384,389 discloses that a by-product, phenol, is removed by distillation after flowing polycarbonate prepolymer produced by transesterification in a molten state to a heated tubular reactor, and then inserting inert gas therein. However, it is difficult to remove phenol in a closed tubular reactor.

In addition, U.S. Pat. No. 5,589,564 discloses preparing polycarbonate by melt polymerization while flowing polycarbonate polymer down the wire strings, bound inside a vertical cylinder reactor regularly and vertically. However, it is difficult to obtain highly polymerized polycarbonate because the residence time is short.

SUMMARY OF THE INVENTION

According to the present invention, polycarbonate of a desired degree of polymerization can be obtained by polycondensation of polycarbonate prepolymer using a horizontal tubular reactor comprising rotating disks, a plurality of compartments divided by the rotating disks. The degree of polymerization of polycarbonate increases continuously when the reactant moves from one compartment to another compartment, and the residence time of the reactant can be controlled by controlling the feed rate of polycarbonate prepolymer. In addition, the final product is prevented from discoloration by discharging by-products, including aromatic alcohol, through the vents.

Figure 1:
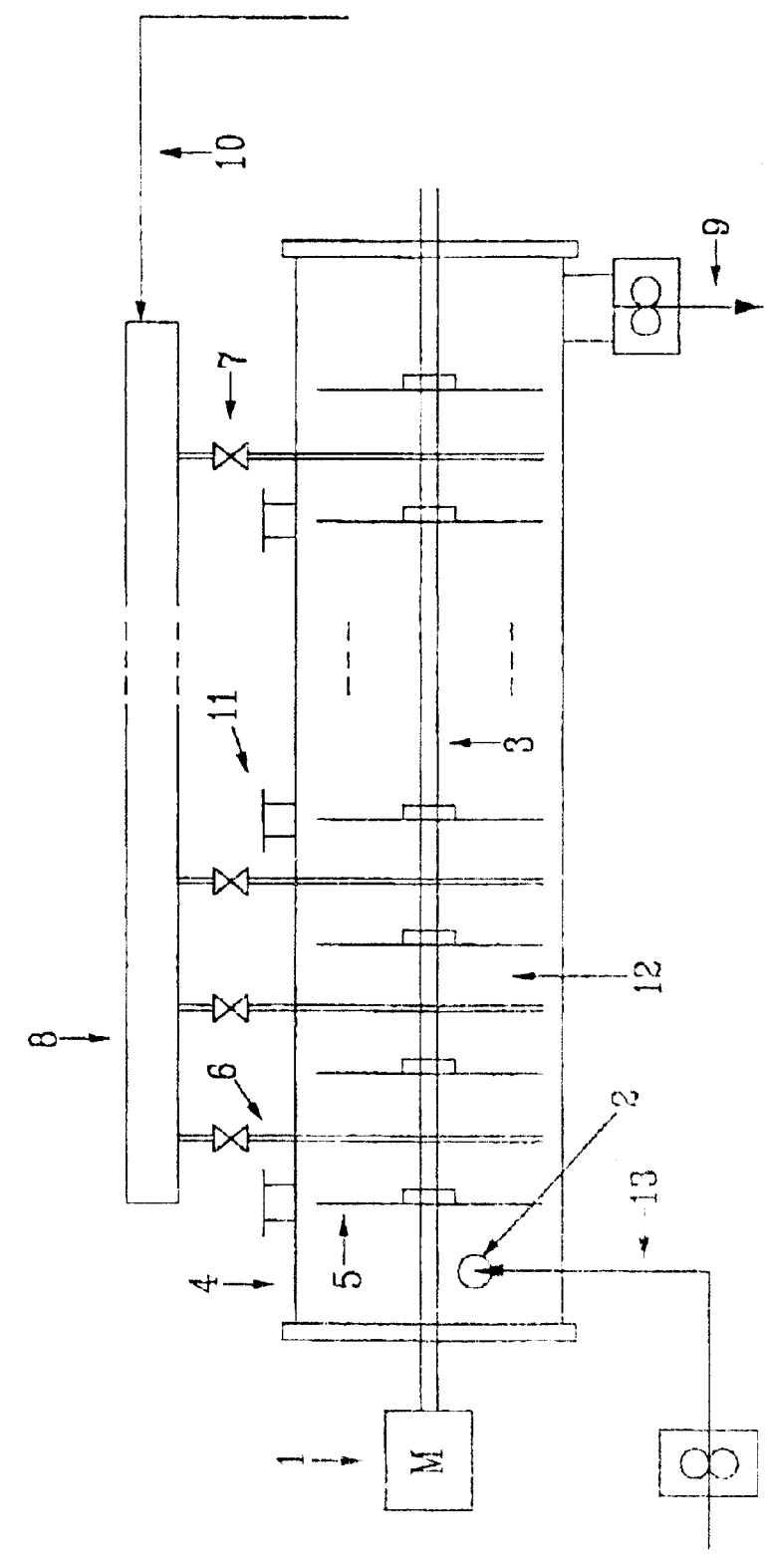
FIG. 1 shows a sectional view of polymerization equipment comprising a horizontal tubular reactor.

| | |
|---|---|
| 1: driving motor | 2: prepolymer feeding inlet |
| 3: shaft | 4: housing for horizontal tubular reactor |
| 5: rotating disk | 6: inert gas injection pipe |
| 7: control vaive | 8: preheater |
| 9: outlet | 10: inert gas feeding pipe |
| 11: vent | 12: compartment |
| 13: prepolymer feeding pipe | |

DETAILED DESCRIPTION AND THE PREFERRED EMBODIMENTS

A process for preparing polycarbonate prepolymer will be explained before explaining the present invention.

Polycarbonate prepolymer is prepared by melt transesterifying a carbonate ester and diol compounds in the presence of a catalyst.

Examples of diol compounds include hydroquinone, resorcinol, dihydroxydiphenyl, bis-(hydroxyphenyl)alkane, bis-(hydroxyphenyl)cycloalkane, bis-(hydroxyphenyl) ketone, bis-(hydroxyphenyl)sulfoxide, bis-(hydroxyphenyl)-sulfide, bis-(hydroxyphenyl)ether, bis-(hydroxyphenyl)sulfone, $\alpha,\alpha'$-bis-(hydroxyphenyl) diisopropylbenzene and derivatives thereof. Preferably, the diol compound is bisphenol-A(2,2-(bis(4-hydroxyphenyl) propane).

The carbonate ester is preferably diphenyl carbonate.

Examples of catalysts include hydroxide, alkoxide, hydrogenated product, carbonate salt, borate salt, acetate salt and hydrogen phosphate of alkali metal, alkali earth metal and transition metal. Preferably, the catalyst is lithium monohydroxide monohydrate ($LiOH \cdot H_2O$) or sodium hydroxide.

The reaction temperature is preferably 180 to 250° C., and the reaction pressure is preferably atmospheric pressure to 1 Torr.

The polymerization equipment used in polycondensation of polycarbonate prepolymers will now be explained in detail.

The polymerization equipment of the present invention used in polycondensation of polycarbonate prepolymers comprises a) a horizontal tubular reactor comprising i) a cylindrical housing; ii) a shaft that is rotated by a motor installed inside said cylindrical housing; iii) a plurality of rotating disks installed vertically to said shift; iv) a plurality of compartments divided by said rotating disks; v) inert gas injection pipes for supplying preheated inert gas to each compartment; vi) vents mounted on top of said housing for discharging by-products and inert gases: vii) a prepolymer feeding inlet mounted on one side of said housing for injecting prepolymer into said housing; viii) an outlet mounted on the other side of said housing for discharging polymer products; and ix) heating means located on an outer circumference of said housing for heating said housing; and b) an inert gas preheater connected to said a) v) inert gas injection pipe.

Said shaft (3) is rotated by a driving motor (1) etc., and it rotates rotating disks (5) that are vertically installed on said shaft (3). In addition, said rotating disks (5) divide compartments (2) and stir the reactants. The number of compartments (12) is preferably 5 to 20.

Said vents (11) discharge by-products, including aromatic alcohol, together with injected inert gas.

The process for preparing highly polymerized polymer of the present invention will now be explained in more detail.

The present invention provides a process for preparing highly polymerized aromatic polycarbonates by melt transesterifying carbonate ester and diol compounds lo prepare polycarbonate prepolymers and polycondensing said prepolymers to prepare aromatic polycarbonate, the process comprising a) continuously feeding said prepolymers to the horizontal tubular reactor of afore-mentioned polymerization equipment through a prepolymer feeding inlet installed therein; b) transferring said prepolymers of step a) from the first compartment to the last compartment in turn while heat polymerizing them to prepare a polymer; and c) continuously discharging said polymer prepared in step b) through the outlet installed in said horizontal tubular reactor.

In the process of the present invention, said step b) is preferably conducted by injecting inert gases into the reactants through the inert gas injection pipes installed in each compartment of the horizontal tubular reactor and by discharging inert gases and by-products, including aromatic alcohol, through the vents installed on top of the horizontal tubular reactor.

Specifically, the prepared polycarbonate prepolymers having a mass average molecular weight of 4,000 to 15,000 are fed from the feeding pipe (13) to the horizontal tubular reactor through the prepolymer feeding inlet (2) installed in the reactor housing. Polymerization begins in the first compartment (12) divided by rotating disk, and then polymers are transferred to the next compartment (12). The degree of polymerization is increased while the polycarbonate prepolymers are transferred continuously from one compartment to next compartment by stirring of the rotating disks (5), and finally polymers are discharged through the outlet (9).

The reaction temperature is 180–400° C., preferably 200–350° C., more preferably 250–320° C., and the reaction pressure is preferably atmospheric pressure.

In addition, the inert gases, that are fed through the inert gas feeding pipe (10) are heated to 250° C. or more in a preheater (8), and then they are injected into each compartment (12) through each inert gas injection pipe (6) in an amount of 0.1 $Nm^3$/kg·h or more. The inert gas injection pipe (6) is preferably equipped with a control valve (7) on its one side to control the amount of preheated inert gases, and the inert gases are preferably nitrogen or carbon dioxide.

Figure 2:
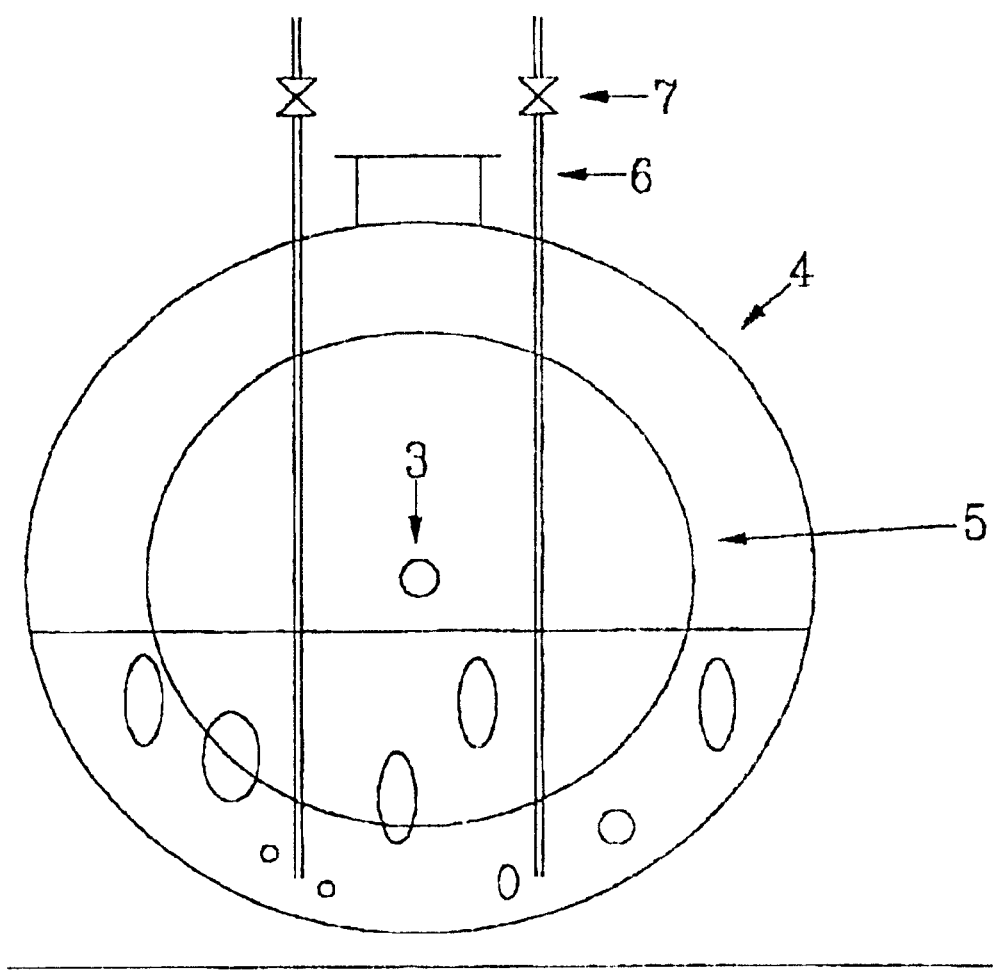
FIG. 2 shows a front view of a horizontal tubular reactor.

In addition, FIG. 2 shows that inert gas facilitates removal of aromatic alcohols during the distillation process since the formation of inert gas bubbles in the reactants increase the mass transfer area and decrease the partial pressure of aromatic alcohols such as phenol.

A variety of heating means can be used to the reactor. It is preferable to install a jacket outside the reactor to use a heating medium.

Thus, polycarbonate of a mass average molecular weight of 10,000 to 60,000, preferably 20,000 to 45,000, is prepared.

The mass average molecular weight is analyzed by GPC (Gel Permeation Chromatography).

The present invention will now be explained in more detail with reference to the following Examples. However, these Examples are to illustrate the present invention, and the present invention is not limited to them.

The length of the horizontal tubular reactor used in the following Examples is 53 cm, the outer circumference thereof is 10 cm, the thickness of the rotating disks is 1 mm, the diameter thereof is 8 cm, the number of rotating disks is 8, the length of each compartment is 5 cm, the inner circumference thereof is 9.8 cm and the number of compartments is 9.

EXAMPLE 1

The Preparation 1 of Aromatic Polycarbonate Prepolymer 1575.2 g (6.9 mole) of bisphenol-A and 1625.93 g (7.59 mole) of diphenyl carbonate were weighed and introduced into individual stirring baths, and then heated to 180° C. to melt. Both compounds were then transferred to a 2.4 L polymerization reactor, 0.1 mole of lithium hydroxidemonohydrate catalyst was introduced therein, and they were reacted for 1 hour. Then they were slowly decompressed to remove phenol by distillation. Thus a polycarbonate prepolymer having a mass average molecular weight of 5,700 was obtained.

EXAMPLE 2

The Preparation 2 of Aromatic Polycarbonate Prepolymer 1575.2 g (6.9 mole) of bisphenol-A and 1552.0 g (7.24 mole) of diphenyl carbonate were weighed and were introduced into individual stirring baths, and heated to 180° C. melt. Both said compounds were then transferred to a 2.4 L polymerization reactor, 0.1 mole of lithium hydroxide monohydrate catalyst was introduced therein, and they were reacted for 1 hours. Then they were slowly decompressed to remove phenol by distillation. Thus a polycarbonate having a mass average molecular weight of 12,800 was obtained.

EXAMPLE 3

The Preparation 1 of highly Polymerized Aromatic Polycarbonate

The polycarbonate prepolymer obtained in Example 1 was fed into a reactor housing (4) at the flow rate of 18 g/min through a prepolymer feeding pipe (13) and feeding inlet (2) using a gear pump, and it was passed through 9 compartments continuously to complete a polymerization reaction.

In addition, nitrogen was introduced into a preheater (8) through an inert gas feeding pipe (10) and was heated to 260° C., and then injected into each compartment (12) at the flow rate of 1.5 $Nm^3$/kg·h through each inert gas injection pipe (6) and control valve (7).

The reaction temperature was fixed at 260° C., the rotation velocity of the shaft (3) was 10 rpm, and the residence time was 75 minutes.

The mass average weight of the prepared polycarbonate was 23,236.

EXAMPLE 4

The Preparation 2 of Highly Polymerized Aromatic polycarbonate

Polycarbonate was prepared under the same reaction conditions as in Example 3, except that the reaction temperature was fixed at 280° C.

The mass average weight of the prepared polycarbonate was 30,323.

EXAMPLE 5

The Preparation 3 of Highly Polymerized Aromatic Polycarbonate

Polycarbonate was prepared under the same reaction conditions as in Example 3, except that the reaction temperature was fixed at 280° C., and the flow rate of nitrogen was reduced to 0.75 Nm$^3$/kg·h.

The mass average weight of the prepared polycarbonate was 26,179.

EXAMPLE 6

The Preparation 4 of Highly Polymerized Aromatic Polycarbonate

The polycarbonate prepolymer obtained in Example 2 was fed into a reactor housing (4) at the flow rate of 18 g/min through a prepolymer feeding pipe (13) and feeding inlet (2) using a gear pump, and it was passed through 9 compartments continuously to complete a polymerization reaction.

In addition, nitrogen was introduced into a preheater (8) through an inert gas feeding pipe (10) and heated to 260° C., and then it was injected into each compartment (12) at the flow rate of 1.5 Nm$^3$/kg·h through each inert gas injection pipe (6) and control valve (7).

The reaction temperature was fixed to 260° C., the rotation velocity of the shaft (3) was 10 rpm, and the residence time was 75 minutes.

The mass average weight of the prepared polycarbonate was 32,328.

EXAMPLE 7

The Preparation 5 of Highly Polymerized Aromatic Polycarbonate

Polycarbonate was prepared under the same reaction conditions as in Example 6, except that the reaction temperature was fixed at 280° C.

The mass average weight of the prepared polycarbonate was 30,323.

EXAMPLE 8

The Preparation 6 of highly Polymerized Aromatic Polycarbonate

Polycarbonate was prepared under the same reaction conditions as in Example 6, except that the reaction temperature was gradually elevated to 260° C., 280° C. and 320° C.

The mass average weight of the prepared polycarbonate was 30,323.

As can be seen from the above Examples 3 to 8, a highly polymerized aromatic polycarbonate having a mass average molecular weight of 10,000 to 60,000 can be prepared at the reaction temperature of 180to 400° C. and the flow rate of nitrogen of 0.1 Nm$^2$/kg·h or more, using a horizontal tubular reactor comprising a plurality of rotating disks (5), a plurality of compartments divided by rotating disks (12), and vents (11).

What is claimed is:

1. Polymerization equipment for preparing highly polymerized aromatic polycarbonate by polycondensation of prepolymers that are produced by melt transesterification of carbonate ester and diol compounds, said polymerization equipment comprising:
    a) a horizontal tubular reactor comprising:
        i) a cylindrical housing;
        ii) a shaft rotatably installed inside said cylindrical housing;
        iii) a plurality of rotating disks installed vertically and affixed to said shaft;
        iv) a plurality of compartments divided by said rotating disks;
        v) a plurality of inert gas injection pipes for injecting preheated inert gas into each compartment;
        vi) a plurality of vents installed on top of said housing for discharging by-products and inert gas;
        vii) a prepolymer feeding inlet installed on one side of said housing for injecting prepolymer into the housing;
        viii) an outlet installed on the other side of said housing for discharging polymer product; and
        ix) heating means located on the outer circumference part of said housing for heating the housing; and
    b) an inert gas preheater installed in connection with said a) v) inert gas injection pipes.

2. The polymerization equipment according to claim 1, wherein the number of a) iv) compartments is 3 to 30.

3. The polymerization equipment according to claim 2, wherein the number:of compartments is 5 to 20.

4. The polymerization equipment according to claim 1, wherein said b) ix) heating means is a heat-medium jacket.

5. The polymerization equipment according to claim 1, further comprising control valves installed in one side of said inert gas injection pipes for control of the amount of inert gas flow.

6. A process for preparing highly polymerized aromatic polycarbonate by melt-transesterifying carbonate ester and diol compounds to prepare polycarbonate prepolymers and polycondensing said prepolymers to prepare aromatic polycarbonate, said process comprising the steps of:
    a) continuously supplying said prepolymers through a prepolymer feeding inlet installed in the horizontal tubular reactor of the polymerization equipment of claim 1;
    b) transferring said prepolymers of said step a) from the first compartment of the horizontal tubular reactor to the last compartment in turn while heat-polymerizing it to prepare polymer; and
    c) continuously discharging said polymers prepared in said step b) through the outlet installed in the horizontal tubular reactor.

7. The process for preparing highly polymerized aromatic polycarbonate according to claim 6, wherein said step b) is conducted under the conditions of injecting inert gas into the reactants through inert gas injection pipes installed in each compartment of the horizontal tubular reactor and discharging inert gas and by-products, including aromatic alcohol, through vents installed on top of the horizontal tubular reactor.

8. The process for preparing highly polymerized aromatic polycarbonate according to claim 7, wherein said inert gas is nitrogen or carbon dioxide.

9. The process for preparing highly polymerized aromatic polycarbonate according to claim 7, wherein the flow rate of said inert gas is 0.1 Nm$^3$/kg·h or more.

10. The process for preparing highly polymerized aromatic polycarbonate according to claim 6, wherein the polymerization temperature in said step b) is 180 to 400° C.

11. The process for preparing highly polymerized aromatic polycarbonate according to claim 10, wherein the polymerization temperature is 200 to 350° C.

12. The process for preparing highly polymerized aromatic polycarbonate according to claim 10, wherein the polymerization temperature is 250 to 320° C.

13. The process for preparing highly polymerized aromatic polycarbonate according to claim 6, wherein the polymerization pressure in said step b) is atmospheric pressure.

14. The process for preparing highly polymerized aromatic polycarbonate according to claim 6, wherein the mass average molecular weight of the prepolymer in said step a) is 4,000 to 150,000.

15. The process for preparing highly polymerized aromatic polycarbonate according to claim 14, wherein the mass average molecular weight of the polymer in said step c) is 10,000 to 60,000.

16. The process for preparing highly polymerized aromatic polycarbonate according to claim 15, wherein the mass average molecular weight of said polymer is 20,000 to 45,000.

* * * * *